(12) United States Patent
Lu et al.

(10) Patent No.: US 12,206,144 B2
(45) Date of Patent: Jan. 21, 2025

(54) POLYSULFIDE-BASED AQUEOUS REDOX FLOW BATTERY WITH SOLUBLE ORGANIC CATALYST

(71) Applicant: The Chinese University of Hong Kong, Hong Kong (CN)

(72) Inventors: Yi-Chun Lu, Hong Kong (CN); Jiafeng Lei, Guangdong (CN)

(73) Assignee: The Chinese University of Hong Kong, Hong Kong (CN)

( * ) Notice: Subject to any disclaimer, the term of this patent is extended or adjusted under 35 U.S.C. 154(b) by 307 days.

(21) Appl. No.: 17/705,171

(22) Filed: Mar. 25, 2022

(65) Prior Publication Data

US 2023/0307682 A1    Sep. 28, 2023

(51) Int. Cl.
*H01M 8/18* (2006.01)
*H01M 4/02* (2006.01)
*H01M 4/96* (2006.01)
*H01M 8/08* (2016.01)

(52) U.S. Cl.
CPC .............. *H01M 8/188* (2013.01); *H01M 4/96* (2013.01); *H01M 8/08* (2013.01); *H01M 2004/027* (2013.01); *H01M 2004/028* (2013.01); *H01M 2300/0002* (2013.01)

(58) Field of Classification Search
None
See application file for complete search history.

(56) References Cited

U.S. PATENT DOCUMENTS

2020/0006796 A1\* 1/2020 Su .................... H01M 4/5815
2020/0044267 A1\* 2/2020 Perry ................. H01M 8/188

FOREIGN PATENT DOCUMENTS

CN         106532094 A       3/2017

OTHER PUBLICATIONS

Zai et al., Sandwiched Cu7S4@graphite felt electrode for high performance aqueous polysulfide/iodide redox flow batteries: Enhanced cycling stability and electrocatalytic dynamics of polysulfides, Materials Chemistry and Physics vol. 250, Aug. 1, 2020, 123143 (Year: 2020).\*
International Search Report and Written Opinion, mailed May 29, 2023, for International Application No. PCT/CN2023/078042 (7 pages).
Li et al., "Material Design of Aqueous Redox Flow Batteries: Fundamental Challenges and Mitigation Strategies," *Advanced Materials* 32(47), Oct. 22, 2020 (30 pages).

\* cited by examiner

*Primary Examiner* — Scott J. Chmielecki
(74) *Attorney, Agent, or Firm* — Seed IP Law Group LLP

(57) ABSTRACT

Provided is an aqueous redox flow battery comprising a positive electrode, a negative electrode, a posolyte chamber containing a posolyte in a solvent, a negolyte chamber containing a polysulfide based negolyte and a soluble organic catalyst in a solvent, and a separator disposed between the posolyte chamber and the negolyte chamber, wherein the soluble organic catalyst has a potential lower than the polysulfide based negolyte.

19 Claims, 10 Drawing Sheets

POLYSULFIDE-BASED AQUEOUS REDOX FLOW BATTERY WITH SOLUBLE ORGANIC CATALYST

TECHNICAL FIELD

The present disclosure is directed to an aqueous redox flow battery, and in particular, to a polysulfide-based aqueous redox flow battery with soluble organic catalyst.

BACKGROUND

Developing inherently safe, cost-effective, and scalable energy storage systems is critical for the intermittent renewable energy integration into the smart grid. Aqueous redox flow battery (RFB) is one of the most competitive technologies for scalable, safe and long-duration energy storage due to its design flexibility in power and energy. All vanadium RFB is the most successful commercialized one, however, its widespread deployments are hindered by the availability and high cost of vanadium material, appealing for next-generation RFBs.

Aqueous polysulfide electrolyte has been extensively studied as a low-cost and high-energy negolyte for RFBs. During charge, the long-chain polysulfide will be reduced by breaking the sulfur-sulfur bonds, forming short-chain polysulfide or sulfur ions. In the discharge process, it will convert back from the short-chain polysulfide to long-chain polysulfide with the formation of sulfur-sulfur bonds by electrochemical oxidization (eqn (1)).

$$S_4^{2-} + 2e^- \leftrightarrow 2S_2^{2-} \quad (1)$$

However, its poor kinetics for electrochemically breaking sulfur-sulfur bonds during the charging process dramatically increase the overpotential, deteriorating the round trip efficiency and causing energy loss. To facilitate the polysulfide reduction during electrochemical process, various metal sulfide including Ni/NiS, Cu/CuS, CoS/CoS$_2$, W/WS$_2$, and metal sulfide/carbon nanotube composite have been adopted as the catalyst in the previous polysulfide/iodide, polysulfide/ferrocyanide and polysulfide/bromine RFBs. Nevertheless, the heterogeneously distributed catalyst on the electrode only has a limited reaction interface and the scalability for large-scale application is challenging. Energy extensive synthesis processes like hydrothermal methods or hydrogen reduction in high temperature are needed for catalyst synthesis, further increasing the cost. The exfoliation issue during continuous liquid flow and instability for catalyst may lead to efficiency decay during long-term operation.

Considering that the advancements of aqueous polysulfide-based batteries catalyst are constrained in limited sulfide compounds, new approaches for promoting polysulfide-based batteries kinetics are urgently desired. Therefore, there is still a need for a catalyst useful in the RFB application.

SUMMARY

In one aspect of the disclosure, an aqueous redox flow battery comprises a positive electrode, a negative electrode, a posolyte chamber containing a posolyte in a solvent, a negolyte chamber containing a polysulfide based negolyte and a soluble organic catalyst in a solvent, and a separator disposed between the posolyte chamber and the negolyte chamber, wherein the soluble organic catalyst has a potential lower than the polysulfide based negolyte.

In some embodiments, the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof. In other embodiments, the soluble organic catalyst is selected from the group consisting of riboflavin sodium phosphate, 1,4-dihydroxyanthraquinone (1,4-DHAQ), 1,8-dihydroxyanthraquinone (1,8-DHAQ), 2-hydroxy-1,4-naphthoquinone (lawsone), bislawsone, and any combination thereof.

In some embodiments, the polysulfide based negolyte is $M_xS_y$, wherein M is a metal element that constitutes a soluble salt with sulfur element, x is 1 or 2, and y is 2 or 4. In other specific embodiments, M is Li, Na, K, Ni, Cu, Co or W. In some embodiments, the solvent in the negolyte chamber is an alkaline aqueous solution. For example, the solvent is an aqueous solution of LiOH, NaOH, KOH or any combination thereof.

In some embodiments, the concentration of the soluble organic catalyst is 5 mM to 200 mM, for example, 10 mM, 15 mM, 20 mM, 25 mM, 30 mM, 35 mM, 40 mM, 45 mM, 50 mM, 100 mM, 150 mM or 200 mM. In some embodiments, the concentration of the negolyte is 0.5 M to 2 M, for example, 1 M, 1.5 M or 2 M. In other embodiments, the ratio of the concentration of the negolyte to the concentration of the soluble organic catalyst is 20 to 500, for example, 30, 40, 50, 60, 70, 80, 90, 100, 150, 200, 250, 300, 350, 400, 450 or 500.

In some embodiments, the posolyte is selected from the group consisting of halogen (I$^-$/I$_3^-$/I$_2$ or Br$^-$/Br$_3^-$/Br$_2$), [Fe(CN)$_6$]$^{4-}$/[Fe(CN)$_6$]$^{3-}$, Fe$^{2+}$/Fe$^{3+}$, Mn$^{2+}$/MnO$_2$, Mn$^{2+}$/Mn$^{3+}$, MnO$_4^{2-}$/MnO$_4^-$, V$^{4+}$/VO$_2^+$, TEMPO ((2,2,6,6-Tetramethylpiperidin-1-yl)oxyl)/TEMPO$^+$, alkaline metal halide, and any combination thereof. In some embodiments, the concentration of the posolyte is 0.5 M to 2 M, for example, 1M, 1.5 M or 2 M. In some other embodiments, the solvent in the posolyte chamber is an aqueous solution of alkaline metal halide.

In some embodiments, the separator is a charge-reinforced ion-selective membrane or an ion permeable membrane. In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

In another aspect of the disclosure, an energy storage system comprises an aqueous redox flow battery, wherein the aqueous redox flow battery comprises a positive electrode, a negative electrode, a posolyte chamber containing a posolyte in a solvent, a negolyte chamber containing a polysulfide based negolyte and a soluble organic catalyst in a solvent, and a separator disposed between the posolyte chamber and the negolyte chamber, wherein the soluble organic catalyst has a potential lower than the polysulfide based negolyte.

In some embodiments, the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof. In other embodiments, the soluble organic catalyst is selected from the group consisting of riboflavin sodium phosphate, 1,4-DHAQ, 1,8-DHAQ, lawsone, bislawsone, and any combination thereof.

In some embodiments, the polysulfide based negolyte is $M_xS_y$, wherein M is a metal element that constitutes a soluble salt with sulfur element, x is 1 or 2, and y is 2 or 4. In other specific embodiments, M is Li, Na, K, Ni, Cu, Co or W. In some embodiments, the solvent in the negolyte chamber is an alkaline aqueous solution. For example, the solvent is an aqueous solution of LiOH, NaOH, KOH or any combination thereof.

In some embodiments, the concentration of the soluble organic catalyst is 5 mM to 200 mM, for example, 10 mM, 15 mM, 20 mM, 25 mM, 30 mM, 35 mM, 40 mM, 45 mM, 50 mM, 100 mM, 150 mM or 200 mM. In some embodiments, the concentration of the negolyte is 0.5 M to 2 M, for example, 1 M, 1.5M or 2 M. In other embodiments, the ratio of the concentration of the negolyte to the concentration of the soluble organic catalyst is 20 to 500, for example, 30, 40, 50, 60, 70, 80, 90, 100, 150, 200, 250, 300, 350, 400, 450 or 500.

In some embodiments, the posolyte is selected from the group consisting of halogen ($I^-/I_3^-/I_2$ or $Br^-/Br_3^-/Br_2$), [Fe$(CN)_6]^{4-}$/[Fe(CN)$_6]^{3-}$, $Fe^{2+}/Fe^{3+}$, $Mn^{2+}/MnO_2$, $Mn^{2+}/Mn^{3+}$, $MnO_4^{2-}/MnO_4^-$, $V^{4+}/VO_2^+$, TEMPO/TEMPO$^+$, alkaline metal halide, and any combination thereof. In some embodiments, the concentration of the posolyte is 0.5 M to 2 M, for example, 1M, 1.5 M or 2 M. In some other embodiments, the solvent in the posolyte chamber is an aqueous solution of alkaline metal halide.

In some embodiments, the separator is a charge-reinforced ion-selective membrane or an ion permeable membrane. In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

In yet another aspect of the disclosure, a method for energy storage comprises using an aqueous redox flow battery, wherein the aqueous redox flow battery comprises a positive electrode, a negative electrode, a posolyte chamber containing a posolyte in a solvent, a negolyte chamber containing a polysulfide based negolyte and a soluble organic catalyst in a solvent, and a separator disposed between the posolyte chamber and the negolyte chamber, wherein the soluble organic catalyst has a potential lower than the polysulfide based negolyte.

In some embodiments, the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof. In other embodiments, the soluble organic catalyst is selected from the group consisting of riboflavin sodium phosphate, 1,4-DHAQ, 1,8-DHAQ, lawsone, bislawsone, and any combination thereof.

In some embodiments, the polysulfide based negolyte is $M_xS_y$, wherein M is a metal element that constitutes a soluble salt with sulfur element, x is 1 or 2, and y is 2 or 4. In other specific embodiments, M is Li, Na, K, Ni, Cu, Co or W. In some embodiments, the solvent in the negolyte chamber is an alkaline aqueous solution. For example, the solvent is an aqueous solution of LiOH, NaOH, KOH or any combination thereof.

In some embodiments, the concentration of the soluble organic catalyst is 5 mM to 200 mM, for example, 10 mM, 15 mM, 20 mM, 25 mM, 30 mM, 35 mM, 40 mM, 45 mM, 50 mM, 100 mM, 150 mM or 200 mM. In some embodiments, the concentration of the negolyte is 0.5 M to 2 M, for example, 1 M, 1.5M or 2 M. In other embodiments, the ratio of the concentration of the negolyte to the concentration of the soluble organic catalyst is 20 to 500, for example, 30, 40, 50, 60, 70, 80, 90, 100, 150, 200, 250, 300, 350, 400, 450 or 500.

In some embodiments, the posolyte is selected from the group consisting of halogen ($I^-/I_3^-/I_2$ or $Br^-/Br_3^-/Br_2$), [Fe$(CN)_6]^{4-}$/[Fe(CN)$_6]^{3-}$, $Fe^{2+}/Fe^{3+}$, $Mn^{2+}/MnO_2$, $Mn^{2+}/Mn^{3+}$, $MnO_4^{2-}/MnO_4^-$, $V^{4+}/VO_2^+$, TEMPO/TEMPO$^+$, alkaline metal halide, and any combination thereof. In some embodiments, the concentration of the posolyte is 0.5 M to 2 M, for example, 1M, 1.5 M or 2 M. In some other embodiments, the solvent in the posolyte chamber is an aqueous solution of alkaline metal halide.

In some embodiments, the separator is a charge-reinforced ion-selective membrane or an ion permeable membrane. In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

DESCRIPTION OF DRAWINGS

Embodiments illustrated herein are further described in the following description in conjunction with the accompanying drawings. However, the drawings are only provided to enable those skilled in the art to better understand the disclosure, rather than limit the scope of the disclosure.

DETAILED DESCRIPTION

Figure 1:
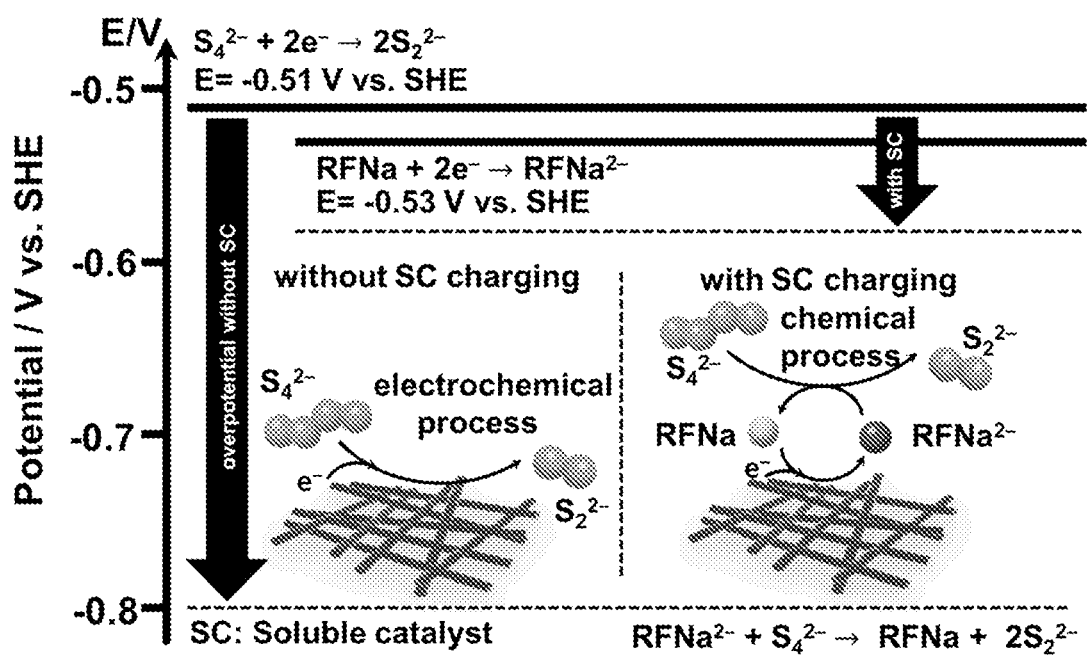
FIG. 1 shows the design principle for soluble catalyst RFNa on polysulfide reduction.

The disclosure will be further illustrated by the following specific embodiments. However, the specific embodiments are listed for illustrative purposes only, and not intended to limit the disclosure. As will be appreciated by those skilled in the art, specific feature(s) according to any one of the following embodiments may be used in any other embodiments without deviating from the spirit of the disclosure.

The inventors of the disclosure have surprisingly found that the soluble catalyst can be used to facilitate polysulfide reduction kinetics by switching the polysulfide reaction pathway from electrochemical pathway to chemical pathway. The soluble catalyst act as an electron carrier between the electrode and the reactants, transferring the electrons to the reactants by spontaneously chemical reactions. In particular, the soluble catalyst with potential lower than polysulfide could be applied to reduce long-chain polysulfide ($S_4^{2-}$) into short-chain polysulfide ($S_2^{2-}$) during charge. Organic molecules comprising elements of C, H, O, N and/or S have intrinsic advantages including potentially low cost, structure flexibility, tunable potential, and solubility. Herein, the electrochemical potential could be measured by the cyclic voltammetry test or the linear sweep voltammetry test, in which the potential is defined as the equilibrium potential of reduction potential and oxidization potential.

In view of the above, the disclosure provides an aqueous redox flow battery, comprising a positive electrode, a negative electrode, a posolyte chamber containing a posolyte in a solvent, a negolyte chamber containing a polysulfide based negolyte and a soluble organic catalyst in a solvent, and a separator disposed between the posolyte chamber and the negolyte chamber, wherein the soluble organic catalyst has a potential lower than the polysulfide based negolyte. The soluble organic catalyst may be selected from the soluble organic compound comprising a heteroatom of O, N and/or S, provided that the potential of the soluble organic catalyst is lower that of the polysulfide based negolyte.

For example, the polysulfide based negolyte is $M_xS_y$, wherein M is Li, Na, K, Ni, Cu, Co or W, x is 1 or 2, and y is 2 or 4. In that case, the soluble organic catalyst may be an alloxazine based compound or an anthraquinone based compound, such as riboflavin sodium phosphate and 1,4-DHAQ.

As an aza-aromatic compound, the alloxazine-based organic compound has been used for the battery due to its fast kinetics and high stability, which becomes an ideal soluble catalyst for polysulfide-based RFBS. Riboflavin sodium phosphate (RFNa), as an example of the alloxazine-based organic compound, is used to verify the catalyst effect in the aqueous polysulfide electrolyte. During charging of the polysulfide-based RFBs, RFNa is reduced to $RFNa^{2-}$ firstly (eqn (2)), which then will react with the long-chain polysulfide (eqn (3)) according to the following chemical reaction:

$$RFNa + 2e^- \leftrightarrow RFNa^{2-} \quad (2)$$

$$RFNa^{2-} + S_4^{2-} \rightarrow RFNa + 2\ S_2^{2-} \quad (3)$$

After the soluble catalyst transfers the electrons to the long-chain polysulfide, it is oxidized back to RFNa, which could be continuously reduced and further provide catalytic effect in the next mediation cycle (eqn (2)). This soluble catalyst strategy could convert the sulfur-sulfur bonds breaking process from electrochemical reduction (eqn (1)) with high overpotential into spontaneous chemical reactions (eqn (3)) by the soluble catalyst which has good kinetics and low overpotential (eqn (2)).

In the disclosure, the reaction mechanism is characterized by UV-vis spectroscopy and electrochemical methods. With 50 mM low concentration soluble catalyst applied, the catalyst effect is demonstrated in a polysulfide/ferrocyanide battery (PSFB) with higher energy efficiency (88% vs. 65% at 10 mA cm$^{-2}$) and improved energy utilization at high current density (98% vs. 52% at 40 mA cm$^{-2}$). In addition, the PSFB shows a high stable operation for more than 1200 cycles with 800 hours in the continuous-flow battery test with the assistance of the charge-reinforced ion-selective (CRIS) membrane under moderate current density of 30 mA cm$^{-2}$. A long-duration charge-discharge test in 10 hours energy storage system (10 hours charging and 10 hours discharging) at 20 mA cm$^{-2}$ is demonstrated for more than 800 hours with a CE of 99.9%.

This universal catalyst strategy has been further applied to other polysulfide-based systems such as polysulfide/iodide batteries (PSIB) and other organic molecules such as anthraquinone, in which 1,4-DHAQ is selected as an example. This is the first time that the soluble catalyst strategy is applied for promoting the polysulfide reduction in the aqueous system. Considering the core-structure variety and design flexibility for tunable potential and solubility in low-cost organic molecules, this strategy would provide new directions for practical application on aqueous polysulfide-based RFBs in large-scale energy storage systems.

The working principle of the soluble catalyst on polysulfide reduction is illustrated in FIG. 1. Due to the soluble catalyst strategy, the electrochemical polysulfide reduction reaction with high overpotential could be converted to the electrochemical reduction of soluble catalyst with low overpotential which chemically reduces the polysulfide. Theoretically, this design principle is universally applicable for active materials with suitable potential which is slightly lower than the polysulfide.

Figure 2:
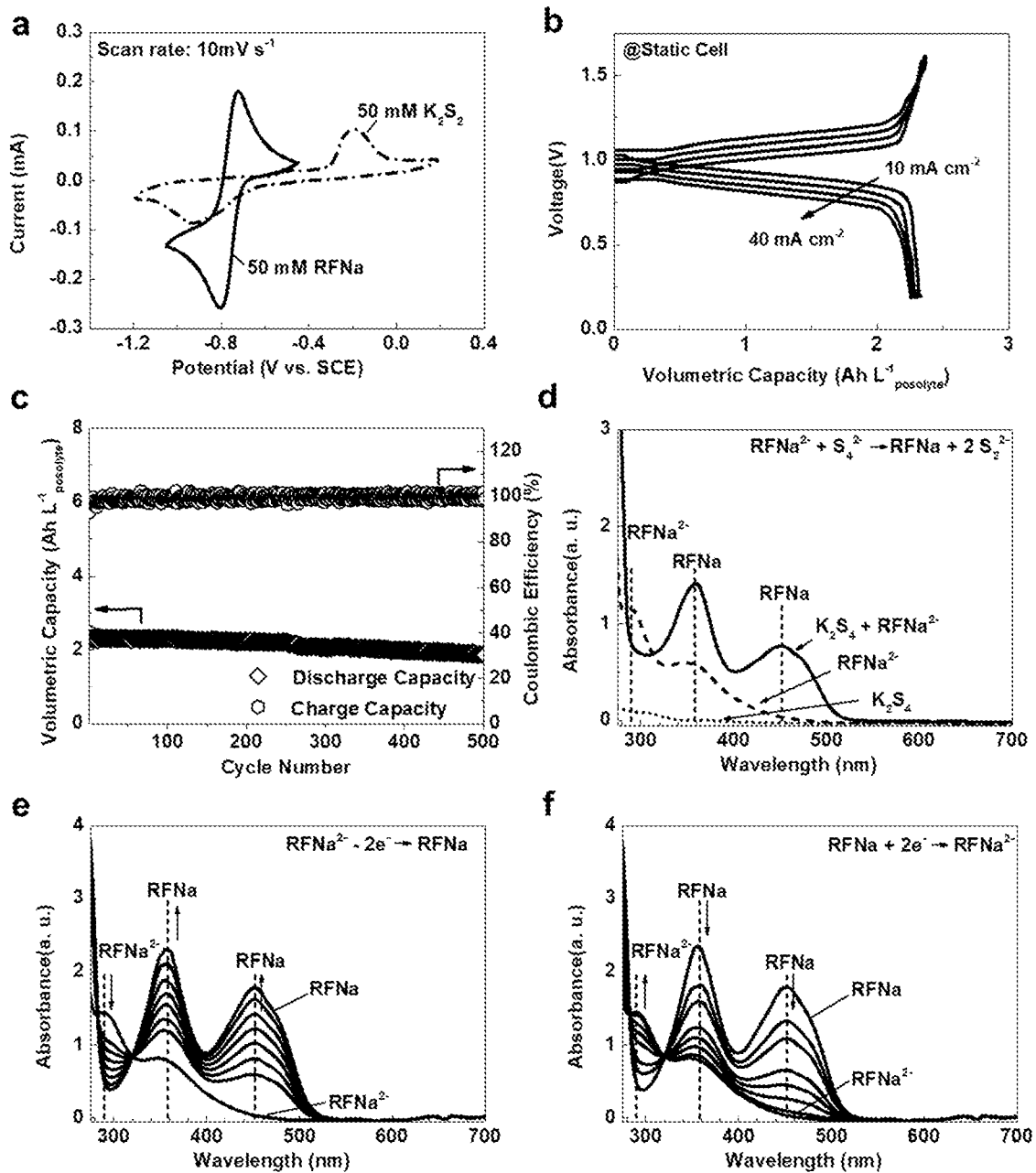
FIG. 2 shows the electrochemical properties for soluble catalyst RFNa, wherein (a) CVs for 50 mM RFNa and polysulfide in 1M KOH under 10 mV s$^{-1}$; (b-c) the rate performance and cycling stability for the 50 mM soluble catalyst RFNa in S—Fe static cell; (d) the UV-vis spectrum for 1 mM K$_2$S$_4$, 1 mM RFNa$^{2-}$ and a mixed solution of K$_2$S$_4$+RFNa$^{2-}$; the in-situ UV-vis spectrum for the 2 mM soluble catalyst (RFNa) during (e) discharge and (f) charge.
Figure 3:
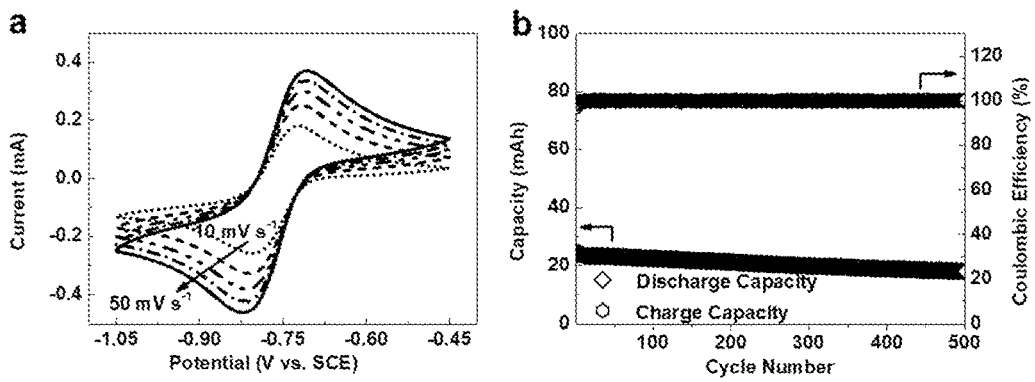
FIG. 3 shows (a) CVs for 50 mM RFNa under different scan rate; (b) the cycling stability for the soluble catalyst RFNa in Flow cell with 10 mL 50 mM RFNa in 1 M KOH as the negolyte and 20 mL 0.5 M K$_4$[Fe(CN)$_6$] in 1M KCl as the posolyte.

As shown in FIGS. 2 and 3, the electrochemical properties of the soluble catalyst and polysulfide are examined by electrochemical methods and UV-vis spectroscopy. The potentials of the soluble catalyst and polysulfide are characterized by cyclic voltammetry (CV) in FIG. 2a. The soluble catalyst has a much smaller overpotential than the polysulfide species on the glassy carbon electrode and the potential (FIG. 2b, −0.53V vs. standard hydrogen electrode (SHE)) is slightly lower than polysulfide species (~−0.45 V vs. SHE). The CV tests in different scan rates show its highly reversible electrochemical behaviors and fast kinetics (FIG. 3a). With ferrocyanide as the posolyte, the static cell for the 0.05M RFNa itself is examined first to determine its potential, capacity contribution, and stability, which shows two-electron transfer (~2.3 Ah L$^{-1}$ for 0.05 M) and high stability with little capacity decay in 500 cycles (FIG. 2d, FIG. 3b). The voltage for the RFNa/ferrocyanide cells is around 1 V, which is consistent with the CV test (FIG. 2a). This organic molecule exhibits good kinetics behaviors and excellent rate performance even at a high current density of 40 mA cm$^{-2}$ (FIG. 2c).

The chemical reaction between the soluble catalyst and polysulfide is verified by the UV-vis test. When mixing the charged catalyst RFNa$^{2-}$ (dashed line, FIG. 2d) with $K_2S_4$, the peaks in 358 nm and 452 nm increase, while the peak in 290 nm decrease (solid line, FIG. 2d). The intensity for polysulfide in such a concentration is low, which has little effect on the peak intensity (dotted line, FIG. 2d). To indicate the changes on the peaks are all from the soluble catalyst itself, an in-situ UV-vis test for the soluble catalyst during the charge and discharge process is conducted (FIG. 2e-f). During discharge, the RFNa$^{2-}$ will be oxidized to RFNa, accompanied by the peak increment in 358 nm and 452 nm and a peak decline in 290 nm (FIG. 2e), which is consistent with the chemical oxidation of soluble catalyst by polysulfide (FIG. 2d). The peak intensity shift is totally reversible in the charging process (FIG. 2f). the test result authenticates that the charged soluble catalyst (RFNa$^{2-}$) could chemically reduce the polysulfide ($S_4^{2-}$) and be oxidized to its original state (RFNa), completing one mediation cycle.

Figure 4:
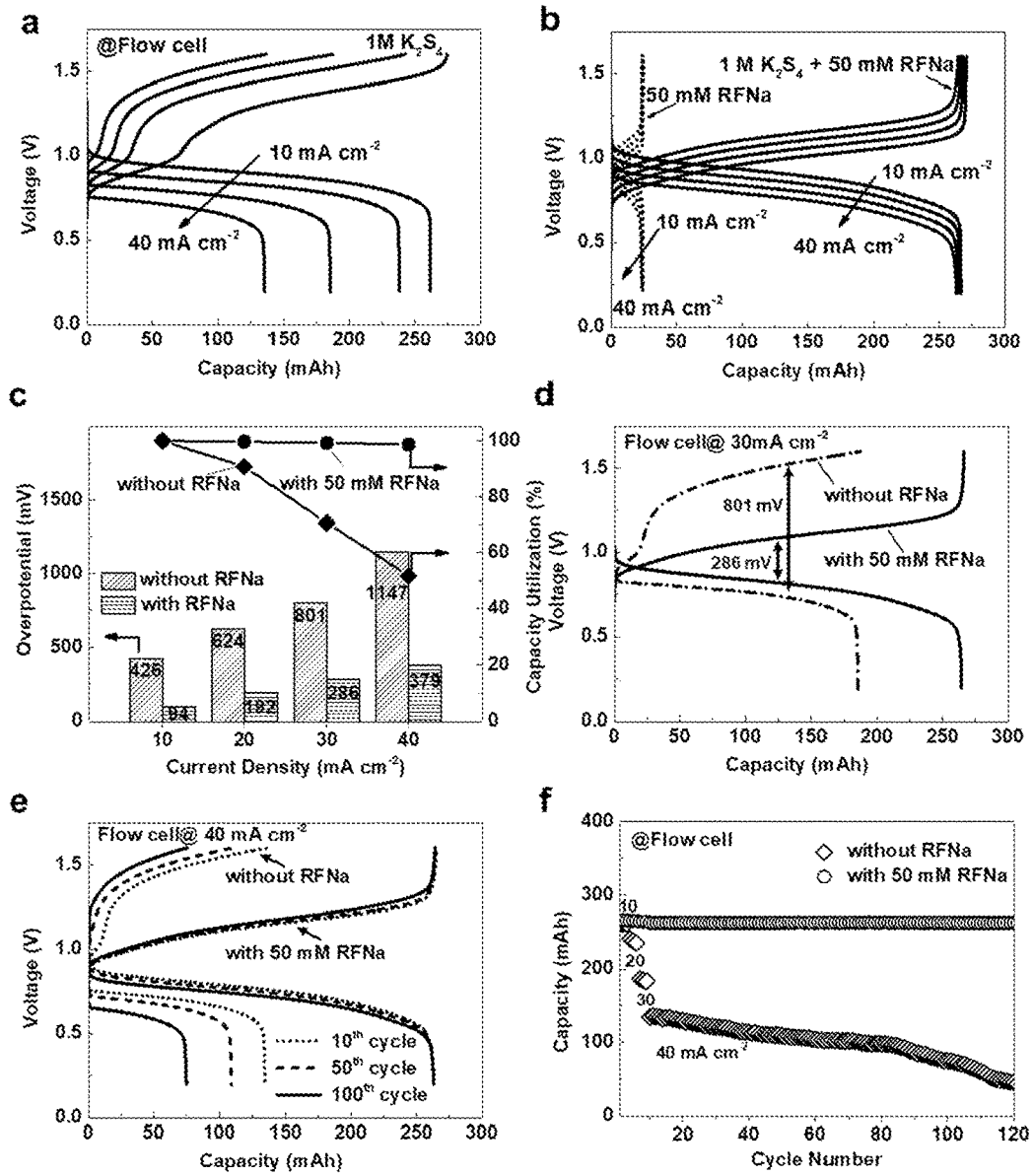
FIG. 4 shows (a) the rate performance for the PSFB with 10 mL 1M K$_2$S$_4$ in 1M KOH as the negolyte and 20 mL 0.5M K$_4$[Fe(CN)$_6$] in 1M KCl as the posolyte; (b) the rate performance for the PSFB with 50 mM RFNa; (c) the capacity utilization and overpotential of the PSFB with or without RFNa under the current density from 10 mA cm$^{-2}$ to 40 mA cm$^{-2}$; the 100% of capacity utilization is defined by the capacity obtained at 10 mA cm 2; (d) the capacity utilization and overpotential measured at 50% SOC; (e-f) the cycling stability for the PSFB with or without 50 mM RFNa. The electrolyte composition for PSFB are 10 mL 1M K$_2$S$_4$ in 1M KOH with or without 50 mM RFNa as the negolyte and 20 mL 0.5 M $K_4[Fe(CN)_6]$ in 1 M KCl as the posolyte. The cycling protocol is conducting rate test with 10 mA $cm^{-2}$, 20 mA $cm^{-2}$, 30 mA $cm^{-2}$ for 3 cycles firstly, which is followed by the long-term cycling with 40 mA cm-2.

In order to examine the catalyst effect on the polysulfide/ferrocyanide battery, two flow cells with or without 50 mM RFNa soluble catalyst are fabricated and rate tests are applied to evaluate the enhancement on the kinetics behaviors. For the PSFB without the soluble catalyst, it shows large overpotential due to the sluggish kinetics for the sulfur-sulfur bond-breaking process (FIG. 4a), which even restricts the electrolyte utilization (56% at 40 mA cm$^{-2}$) at high current density under 1.6V cut-off voltage (FIG. 4c). Encouragingly, the presence of the soluble catalyst greatly decreases the overpotential (FIG. 4b-c) and the capacity utilization remains high (98% at 40 mA cm$^{-2}$) at high current density. The overpotential in the catalyst-free cell is 4 times higher than the catalyst-assisted cell (426 mV vs. 94 mV) at the low current density of 10 mA cm$^{-2}$ and nearly 3 times higher (801 mV vs. 286 mV) at a moderate current density of 30 mA cm$^{-2}$ (FIG. 4c-d). The capacity contribution from the soluble catalyst itself in different current densities is included in FIG. 4b with dashed lines, indicating that the capacity contribution from itself (<25 mAh) is not the main reason for the performance boost but the catalyst effect is.

Such a big discrepancy in the overpotential and energy efficiency corroborates the catalyst effect on the polysulfide electrolyte. The cycling stability of the catalyst-assisted PSFB was also examined, exhibiting stable operation for more than 100 cycles at a high current density of 40 mA cm' (FIGS. 4e-f). Nevertheless, the catalyst-free cell shows limited capacity utilization and poor cycling life due to its sluggish kinetics behaviors under such high current density. The results demonstrate that a low concentration of soluble catalyst could effectively improve the kinetics behaviors and cycling stability for the PSFB system.

The asymmetric behaviors on the aqueous polysulfide-based batteries with high overpotential on charging process are verified on the polarization test, in which the soluble catalyst greatly changes the charge polarization curve, making it into a symmetric electrochemical process. At 50% SOC for the PSFB without the soluble catalyst (FIG. 5), it shows limited power capability for charging, which is consistent with the rate test that sulfur anode shows sluggish kinetics behaviors during the charging process. The charging power under 1.6 V is 6 times higher than the original one with the assistance of soluble catalysts. The addition of soluble catalyst notably changes the charge polarization curve, making it into a symmetric electrochemical process.

Figure 6:
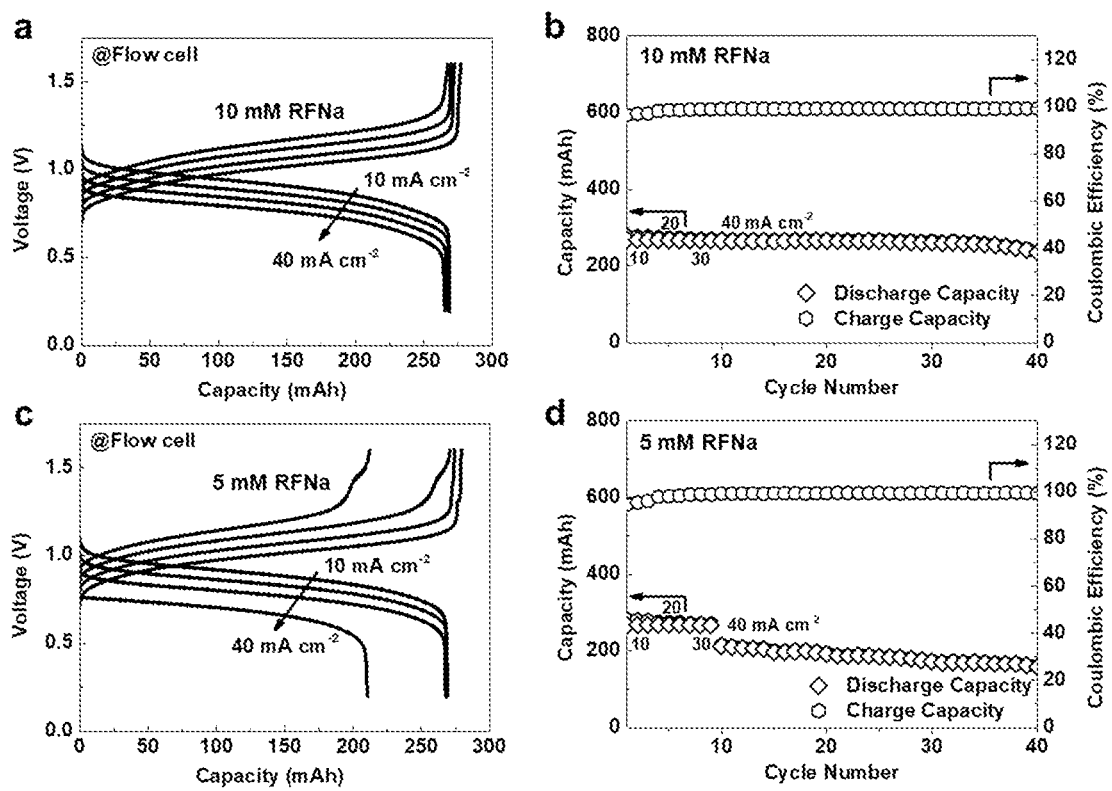
FIG. 6 shows (a-b) the rate performance and cycling stability for the PSFB with 10 mM RFNa as the soluble catalyst; (c-d) the rate performance and cycling stability for the PSFB with 5 mM RFNa as the soluble catalyst. The electrolyte composition for PSFB are 10 mL 1M $K_2S_4$ in 1M KOH as the negolyte and 20 mL 0.5 M $K_4[(Fe(CN)_6)]$ in 1 M KCl as the posolyte. The cycling protocol is conducting rate test with 10 mA $cm^{-2}$, 20 mA $cm^{-2}$, 30 mA $cm^{-2}$ for 3 cycles firstly, which is followed by the long-term cycling with 40 mA cm'.

The electrochemical mediation process may be affected by the mediation concentration, current density, and sulfur concentration. The PSFB with 5 mM and 10 mM soluble catalysts are manufacture to expose the concentration effect on polysulfide-based RFBs (FIG. 6). For the cell with 5 mM RFNa, it still shows an impressive mediation effect under low current density (10-20 mA cm$^{-2}$), while the mediation effect is circumscribed at high current density (>30 mA cm$^{-2}$) due to its retarded chemical reaction (eqn (3)) rate under low concentration. For the cell with 10 mM RFNa, it shows improved rate performance by higher soluble catalyst concentration but the stability needs to be further optimized.

With a fixed sulfur concentration, if the soluble catalyst concentration is too low, the chemical reaction rate may not be fast enough to support the chemical polysulfide reduction process within a short time (high current density), which would also affect the stability. Thus, 50 mM is selected as the optimized concentration to support improved rate performance and enough stability. Herein, the soluble catalyst concentration is limited by the low solubility of the soluble catalyst RFNa itself, which could be further optimized by functional group (—OH, —COOH, —PO$_3^-$, SO$_3^{2-}$ etc.) modification that is commonly applied for organic RFBs. The following works on higher soluble catalyst concentration could offer better performance.

Figure 7:
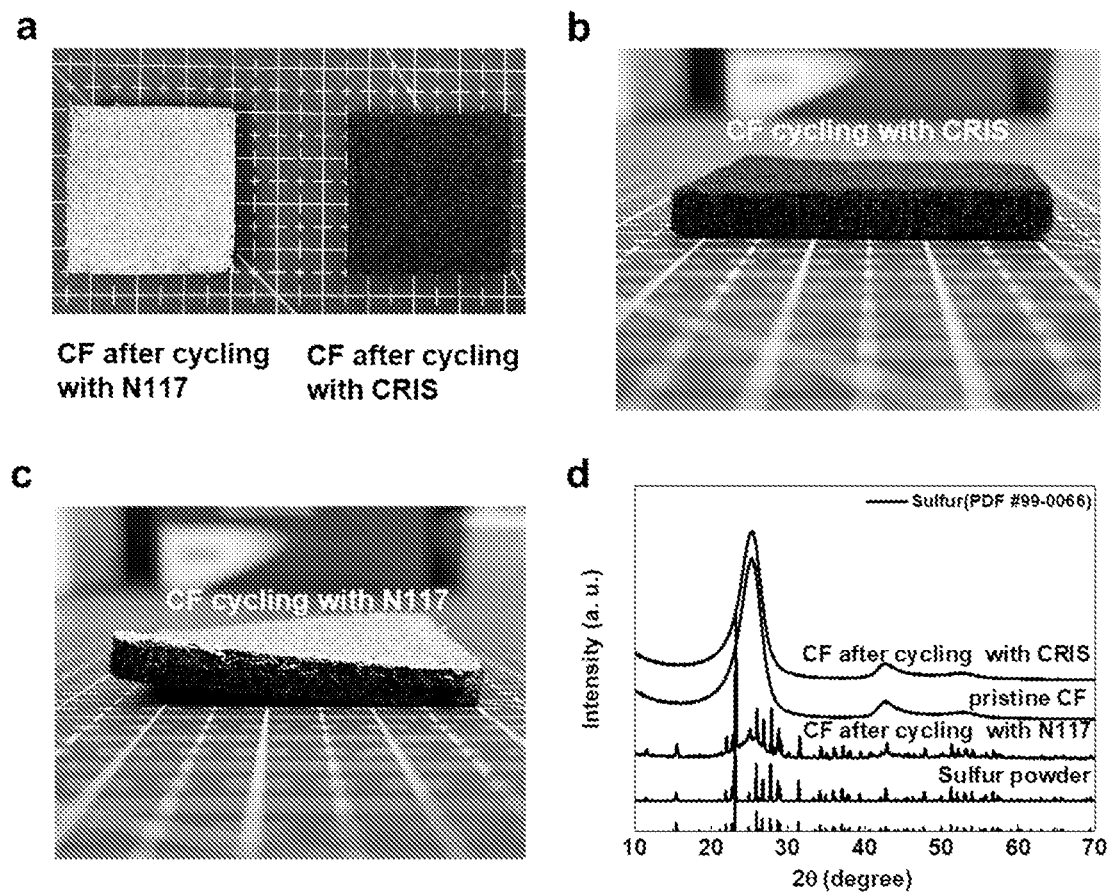
FIG. 7 shows (a-c) the optical images for the carbon felt on the positive side after 70 cycles in a 50 mM soluble catalyst assisted-PSFB with Nafion 117 or CRIS as the membrane; (d) the XRD pattern for the sulfur powder, pristine carbon felt and carbon felt after cycling with N117 or CRIS as the membrane.
Figure 8:
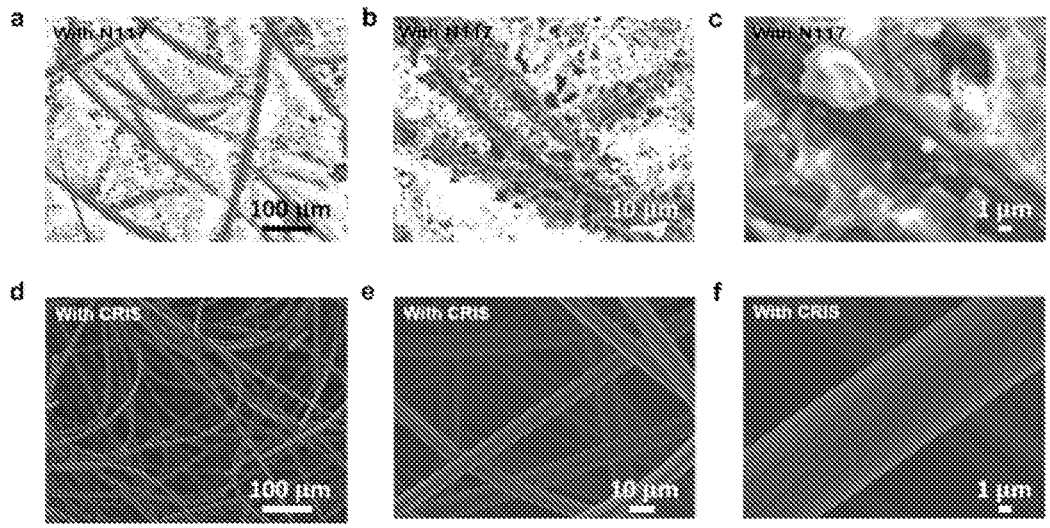
FIG. 8 shows the SEM images for the carbon felt on the positive side in the PSFB with (a-c) Nafion 117 or (d-f) CRIS as the membrane.

The cycling stability on the soluble catalyst-assisted PSFB is also examined for providing rational design navigation for practical aqueous polysulfide-based RFBs. The crossover of polysulfide is the uppermost inducement for capacity decay and batteries failure. After crossing the cation exchange membrane from anolyte to the anolyte, the polysulfide would be directly oxidized to sulfur precipitating on the carbon felt electrode on the positive side. After 70 cycles, the carbon felt on the positive side was obtained and the yellow precipitation layer was observed on the surface near the membrane side (FIG. 7a and FIG. 7c). The XRD confirmed that the precipitated solid belongs to sulfur Se with the appearance of sulfur peaks and the decrease of carbon peak signal due to the blockage from the thick sulfur layer (FIG. 7d). This is consistent with the SEM images that the non-conductive sulfur cluster wrapped the carbon fiber with a limited reaction area for electrochemical reactions (FIG. 8).

Figure 9:
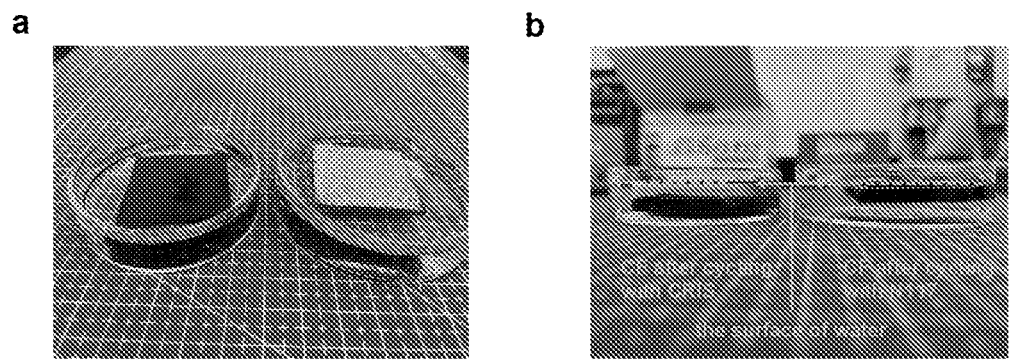
FIG. 9 shows the carbon felt after cycling with different membrane are placed in water.

Except for the capacity decay from active material loss on the negative side, the sulfur layer from polysulfide crossover is hydrophobic as it is floated on the surface of the water instead of absorbing water and sinking to the bottom (FIG. 9). The hydrophobic property would prevent the ions from transportation, leading to battery failure which could only be fixed by disassembling the stack, changing electrodes. A charge-reinforced ion exchange (CRIS) membrane was found to improve the limited cycling life of polysulfide-based batteries by the repelling effect of the charged carbon layer. Here, the active carbon (Ketgen Black) with high surface area can be coated on the Nafion 117 membrane to provide a long cycle life for polysulfide-based RFBs. After cycling with the help of CRIS, the carbon felt on the positive side after cycling shows a clean surface with no sulfur precipitation observed and the hydrophilia property remains (FIGS. 7-9). This phenomenon emphasizes the significance of the CRIS on the sulfur-based RFBs as the crossover of sulfur would not only lead to a capacity loss but also the electrode failure which could only be fixed by disassembling the stack, changing electrodes.

Figure 10:
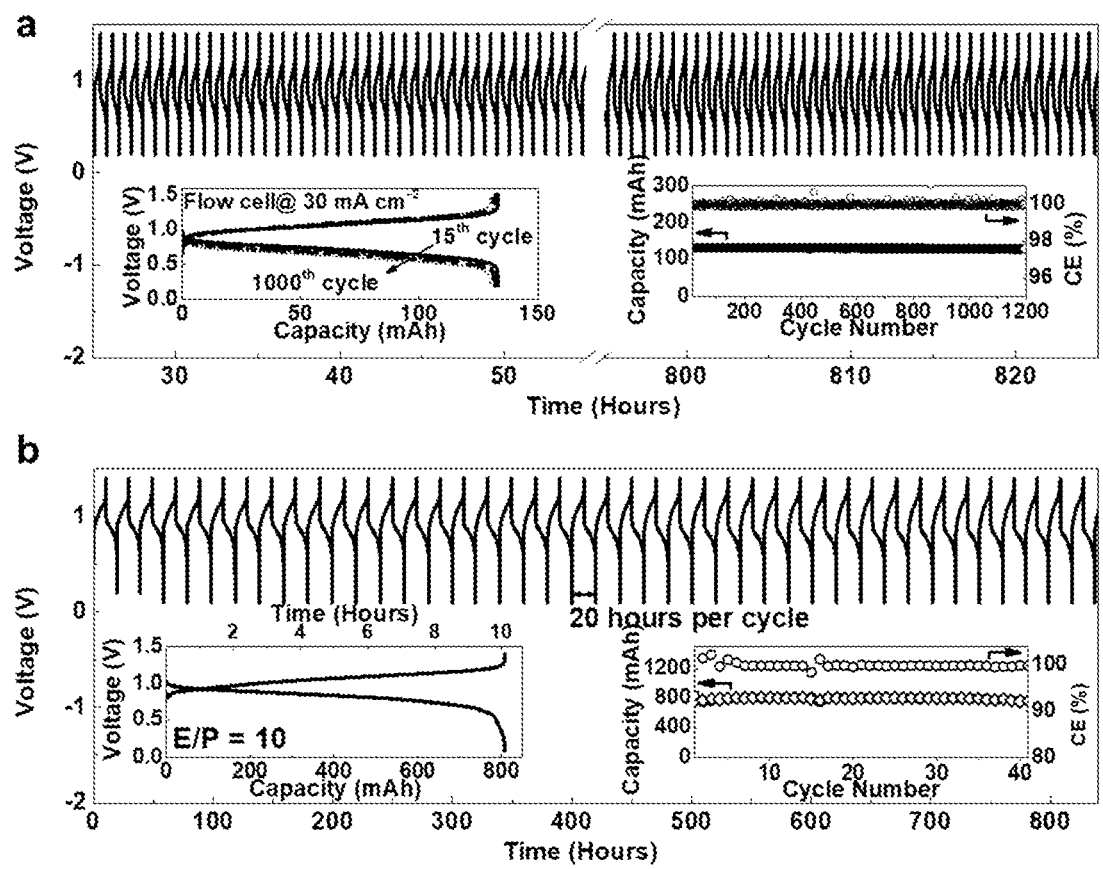
FIG. 10 shows (a) the long-term cycling stability for PSFB with 10 mL 1 M $K_2S_4$ in 1 M KOH as the negolyte and 10 mL 0.5 M $K_4[Fe(CN)_6]$ in 1 M KCl as the posolyte, wherein the cell has cycled for more than 800 cycles and 800 hours, and the electrolyte composition for PSFB are 10 mL 1M $K_2S_4$ in 1M KOH with 50 mM RFNa as the negolyte and 10 mL 0.5 M $K_4[Fe(CN)_6]$ in 1 M KCl as the posolyte; (b) the PSFB with long-duration (20 hour for each cycle) charging-discharging test (10 hours for charging and 10 hours for discharging) with 30 mL 1 M $K_2S_4$ and 50 mM RFNa in 1M KOH as the negolyte and 60 mL 0.5 M $K_4[Fe(CN)_6]$ in 1 M KCl as the posolyte.
Figure 11:
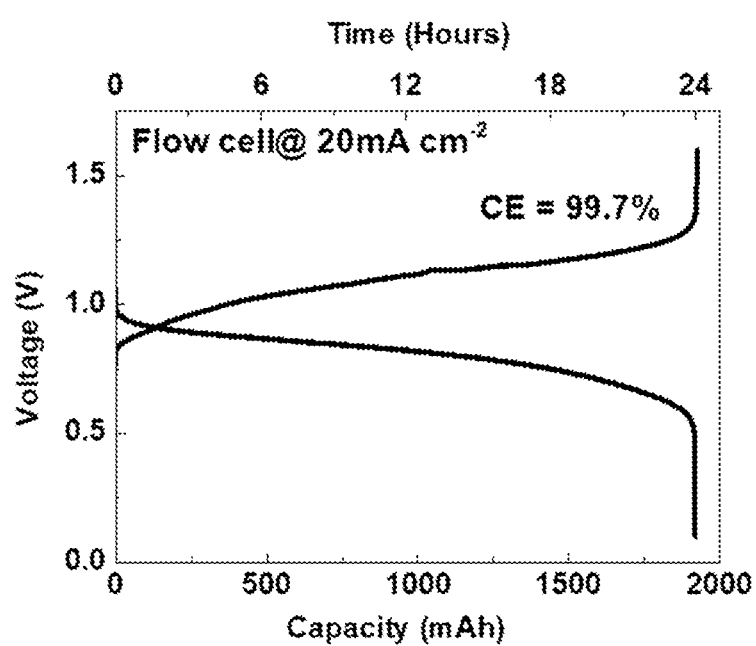
FIG. 11 show a 1.9 Ah flow cell with a E/P ratio of 24.

After applying the CRIS membrane in PSFB, the flow cell can be subjected to more than 700 cycles and 500 hours (more than 24 days) operation with a small decay rate of only 0.00146%/cycle and 0.04776%/day under 100% SOC operation at 30 mA cm$^{-2}$ (FIG. 10a). To show its potential on the long-duration energy storage system, a flow cell with an E/P ratio of 10 (10 hours for charging and 10 hours for discharging) was manufactured. This cell shows a stable operation for 800 hours with little capacity decay and the CE could reach 99.9% (FIG. 10b). A 1.9 Ah cell with 24 hours energy storage under 20 mA cm$^{-2}$ was further demonstrated, which shows its great potential on practical long-duration energy storage applications (FIG. 11).

Figure 12:
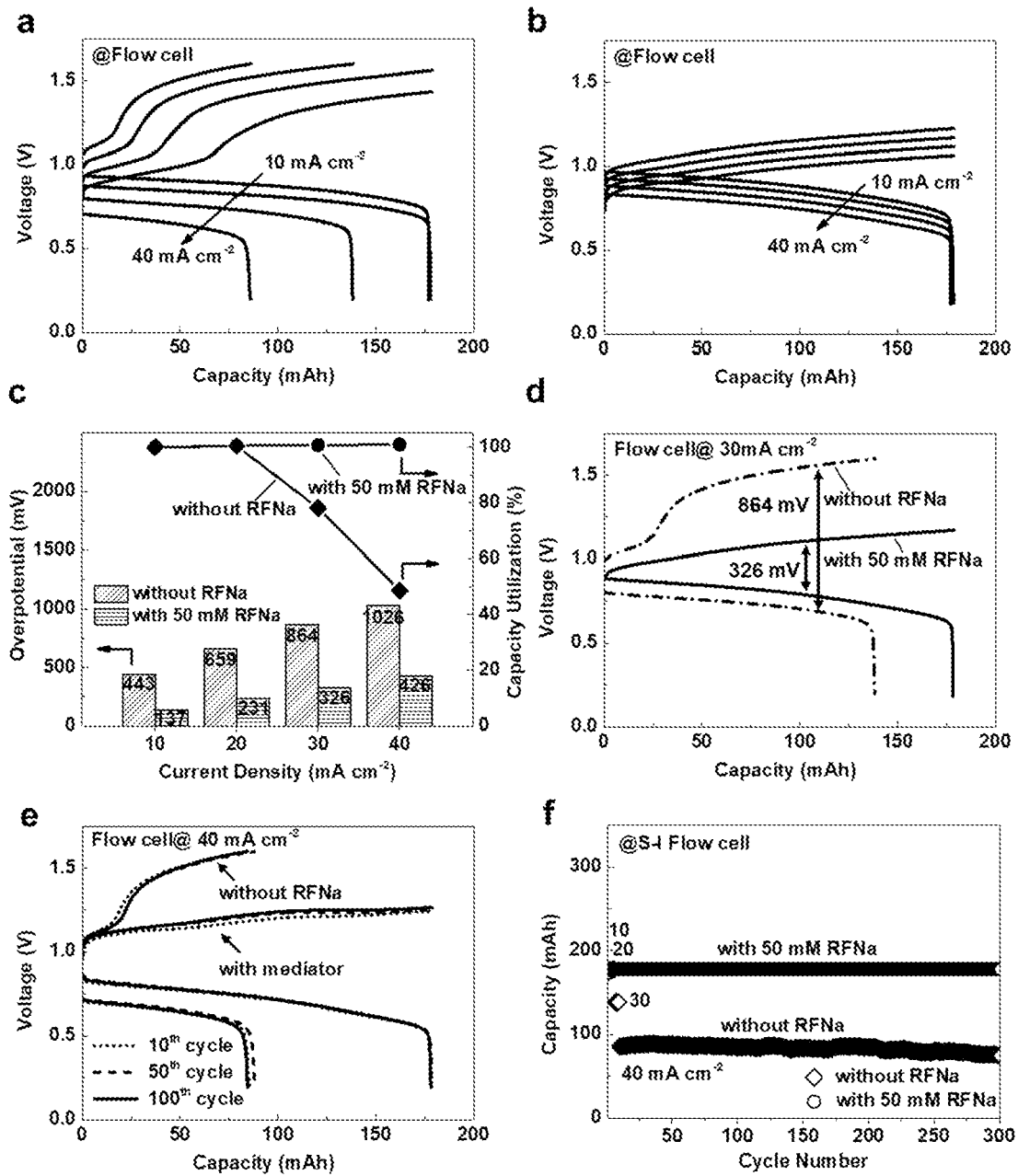
FIG. 12 shows (a) the rate performance for the PSIB with 10 mL 1 M $K_2S_4$ in 1 M KOH as the negolyte and 10 mL 2 M KI in 1M KCl as the posolyte, the PSIB cycling condition is reaching 50% SOC (178.4 mAh) or reaching cut-off voltage of 1.6V; (b) the rate performance for the PSIB with 50 mM RFNa; (c) the capacity utilization and overpotential of the PSIB with or without RFNa under the current density from 10 mA $cm^{-2}$ to 40 mA cm 2, the 100% of capacity utilization is defined by the capacity obtained at 10 mA cm 2; (d) the overpotential difference for the PSIB with or with soluble catalyst under 30 mA $cm^{-2}$ at 30% SOC; (e-f) the cycling stability for the PSFB with or without 50 mM RFNa. The electrolyte composition for PSFB are 10 mL 1M $K_2S_4$ in 1M KOH with or without 50 mM RFNa as the negolyte and 10 mL 2 M KI in 1M KCl as the posolyte. The cycling protocol is conducting rate test with 10 mA cm', 20 mA $cm^{-2}$, 30 mA $cm^{-2}$ for 3 cycles firstly, which is followed by the long-term cycling with 40 mA cm'.
Figure 13:
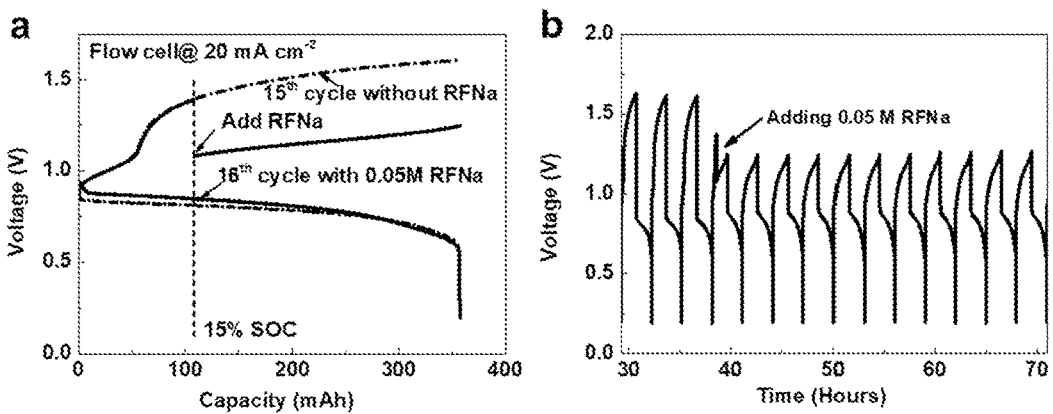
FIG. 13 shows the voltage profile for the PSIB before and after adding 50 mM RFNa during cycling with 10 mL 1M $K_2S_4$ in 1M KOH as the negolyte and 10 mL 4M KI as the posolyte.

Except for the PSFB system, this universal catalyst principle could also be applied to other polysulfide-based systems like the polysulfide/iodide system. Similarly, the polysulfide/iodide battery (PSIB) shows a large overpotential on the bare carbon felt electrode (FIG. 12a), which could be greatly improved by soluble catalysts (FIGS. 12b-d). The overpotential under 30 mA cm-2 is only half of the original cell (326 mV vs. 763 mV). The stable operation for the catalyst-assisted cell was demonstrated to indicate its high stability for more than 300 cycles in the PSIB under 40 mA cm$^{-2}$ (FIG. 12). The function of the soluble catalyst on the decrease of overpotential was further examined by adding RFNa into the 4 M KI-PSIB cell during the charging process. Surprisingly, the overpotential dramatically decreases after adding 0.05 M RFNa, showing stable performance, which is consistent with the previous results (FIG. 13).

Figure 5:
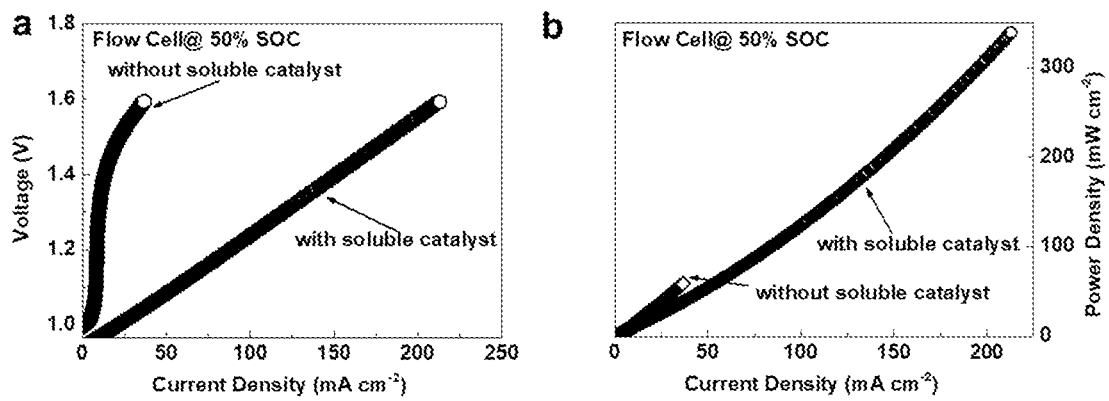
FIG. 5 shows (a) polarization curve for the PSFB in the charging process with 10 mL 1M $K_2S_4$ in 1M KOH as the negolyte and 20 mL 0.5M $K_4[Fe(CN)_6]$ in 1M KCl as the posolyte; (b) the charge power in the charging process for the PSFB system under 50% SOC. The electrolyte composition for PSFB are 10 mL 1M $K_2S_4$ in 1M KOH with or without 50 mM RFNa as the negolyte and 20 mL 0.5 M $K_4[Fe(CN)_6]$ in 1 M KCl as the posolyte.
Figure 14:
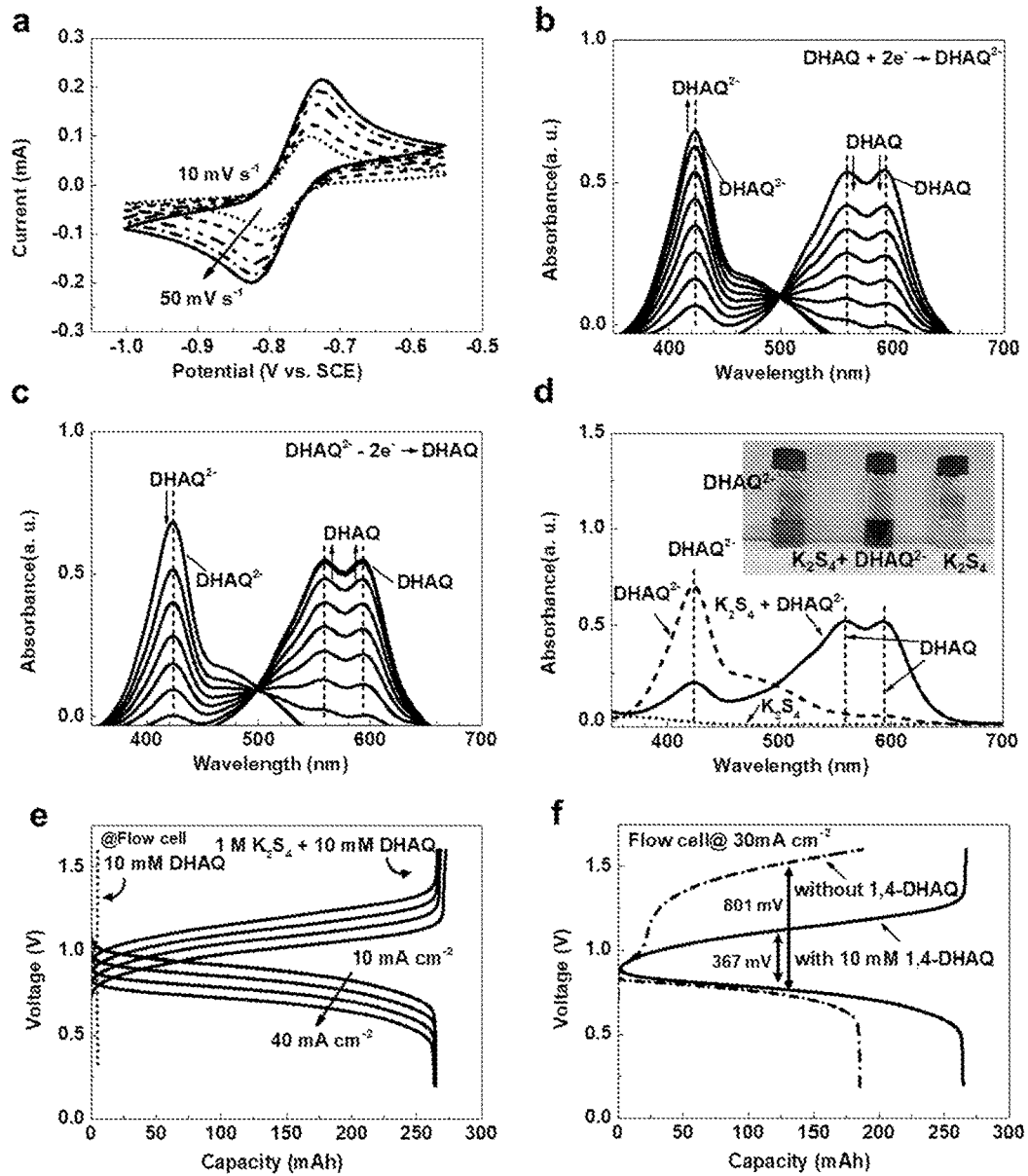
FIG. 14 shows (a) CVs for 50 mM 1,4-DHAQ in 1M KOH under different scan rate; the in-situ UV-vis spectrum for the 0.5 mM soluble catalyst (1,4-DHAQ) during (b) charge and (c) discharge; (d) the UV-vis spectrum for 0.5 mM $K_2S_4$, 0.5 mM 1,4-DHAQ and a mixed solution of $K_2S_4$+1,4-DHAQ, the inset shows the optical images for the solutions; (e) the rate performance for the PSFB with 10 mM 1,4-DHAQ, the capacity contribution of 1,4-DHAQ itself under 10 mA cm-2 is shown with a dotted line; (f) the overpotential difference under 30 mA cm' with or without 10 mM 1,4-DHAQ as the soluble catalyst. The electrolyte composition for PSFB are 10 mL 1M $K_2S_4$ in 1M KOH with or without 10 mM 1,4-DHAQ as the negolyte and 20 mL 0.5 M $K_4[Fe(CN)_6]$ in 1 M KCl as the posolyte.
Figure 15:
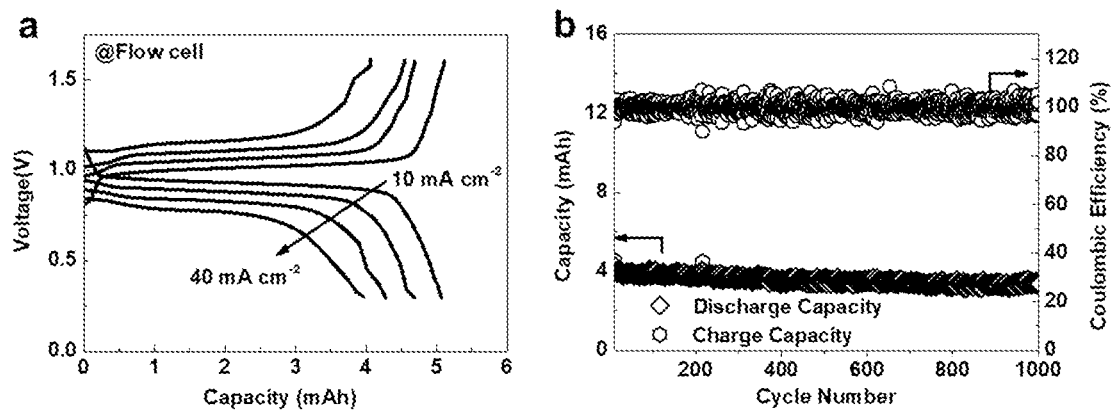
FIG. 15 shows (a) the rate performance and (b) the cycling stability for the soluble catalyst 1,4-DHAQ itself in Flow cell with 10 mL 10 mM 1,4-DHAQ in 1M KOH as the negolyte and 20 mL 0.5 M $K_4[Fe(CN)_6]$ in 1 M KCl as the posolyte. The cycling protocol is conducting rate test with 10 mA $cm^{-2}$, 20 mA $cm^{-2}$, 30 mA $cm^{-2}$ for 3 cycles firstly, which is followed by the long-term cycling with 40 mA cm-2.

To extend the soluble catalyst approach to other organic molecules except for alloxazine to demonstrate multiple choices on the organic molecules, 1,4-DHAQ, a kind of anthraquinone, is selected as an example. This anthraquinone could be obtained from phthalic anhydride and 4-chlorophenol and the production cost could be extremely low. The CVs for 1,4-DHAQ were conducted firstly, whose potential (FIG. 14a, −0.53V vs. SHE) is lower than the polysulfide species. The in-situ UV-vis spectroscopy of DHAQ during charge and discharge was conducted to identify the peak variation in different states. During the charging process of DHAQ, it shows that the peak around 464 nm increases, while the peaks on 594 nm and 554 nm keep decreasing (FIG. 14b). In the discharge process, the peak change trend is opposite and reversible (FIG. 14c). Thus, the peak on 464 nm is ascribed to the reduced form of DHAQ$^{2-}$, while the peaks on 594 nm and 554 nm are ascribed to the oxidized form of DHAQ. When mixing the solution of charged DHAQ$^{2-}$ and K$_2$S$_4$, the solution turn purple, and the peak on the 464 nm decrease while the peaks on 594 nm and 554 nm appear, which is a signal of oxidation for DHAQ by K$_2$S$_4$ (FIG. 14d). The stability of DHAQ itself was examined and its capacity contribution under such low concentration (10 mM) is limited (FIG. 15, ~5 mAh).

Figure 16:
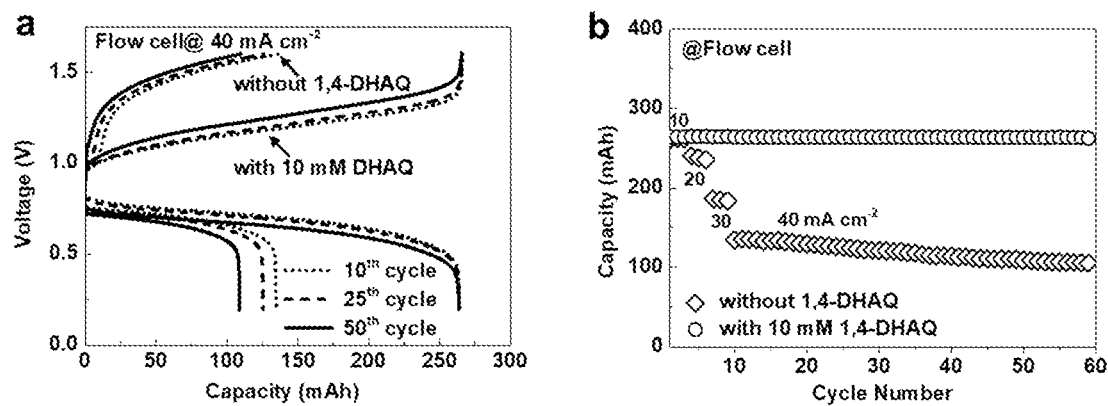
FIG. 16 shows (a) the voltage profile and (b) the cycling stability for the PSFB with or without 10 mM DHAQ as the soluble catalyst. The flow cell composition is 10 mL 1 M $K_2S_4$ with 10 mM 1,4-DHAQ in 1M KOH as the negolyte and 20 mL 0.5 M $K_4[Fe(CN)_6]$ in 1 M KCl as the posolyte. The cycling protocol is conducting rate test with 10 mA $cm^{-2}$, 20 mA $cm^{-2}$, 30 mA $cm^{-2}$ for 3 cycles firstly, which is followed by the long-term cycling with 40 mA cm'.

After verifying the chemical reactions between the charged DHAQ and K$_2$S$_4$, the PSFB cell with DHAQ is fabricated, showing that applying 0.01 M quinone dramatically decrease the overpotential and improved the rate performance (FIGS. 14e-f). Similar to RFNa, it shows higher capacity utilization under high current density with little capacity decay (FIG. 16). Even though the solubility of 1,4-DHAQ itself is low, the functional group modification method could further improve the stability and solubility. Increasing the soluble catalyst concentration could effectively improve the overall performance of the soluble catalyst-assisted polysulfide-based batteries.

As usual, low active material concentration and low SOC would be beneficial to the stability of the organic molecules as they would decrease the side reaction rate. However, in the soluble catalyst-assisted flow cell, the active material is always in the oxidized form (low SOC for the organic molecule) due to the fast chemical reaction with the polysulfide, and the concentration could be low, which are all profitable for the long-term stability for organic molecules. In another word, polysulfide could be regarded as an energy booster for organic molecules to keep it in low concentration and low SOC but deliver high energy, especially considering that sulfur is one of the cheapest raw materials.

As demonstrated in the above, the basic chemical principle between the soluble catalyst and polysulfide has been verified by UV-vis spectroscopy. In particular, the polysulfide/ferrocyanide battery flow cell with soluble catalyst shows greatly improved kinetics behaviors with much smaller overpotential (286 mV vs. 801 mV under 30 mA cm') and high capacity utilization under high current density. With the help of CRIS membrane, the PSFB system shows stable cycling stability for 800 cycles with little capacity decay, and 10 hours energy storage system is exhibited for continuous operation for more than 40 cycles and 800 hours. The soluble catalyst strategy is applied to other polysulfide-based batteries such as polysulfide/iodide batteries, in which the decrease in the overpotential (326 mV vs. 763 mV under 30 mA cm') was observed. The universal soluble catalyst principle could be further applied to other organic molecules such anthraquinone 1,4-DHAQ, in which the soluble catalyst principle and the facilitation on polysulfide are exhibited.

Therefore, it is believed that the soluble catalyst strategy could easily improve the sluggish polysulfide kinetics with low-cost organic molecules which shows great potential on its flexible structure for tunable potential and solubility. In other words, the soluble catalyst strategy is proved to promote the kinetics behaviors for aqueous polysulfide-based RFBS and improve its cycling stability. This is the first time that the soluble catalyst strategy is introduced into the aqueous polysulfide system, which may shed light on other energy storage systems to promote its kinetics behaviors for practical large-scale applications.

While embodiments have been shown and described above, it will be apparent to those skilled in the art that various changes and modifications may be made without departing from the invention in its broader aspects. The appended claims, therefore, are intended to cover all such changes and modifications as they fall within the true spirit and scope of the invention.

What is claimed is:

1. An aqueous redox flow battery, comprising:
   a positive electrode;
   a negative electrode;
   a posolyte chamber containing a posolyte in a solvent;
   a negolyte chamber containing a polysulfide based negolyte and a soluble organic catalyst in a solvent, and
   a separator disposed between the posolyte chamber and the negolyte chamber, wherein:
   the soluble organic catalyst has a potential lower than the polysulfide based negolyte; and
   a ratio of a concentration of the negolyte to a concentration of the soluble organic catalyst is 20 to 500.

2. The aqueous redox flow battery of claim 1, wherein the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof.

3. The aqueous redox flow battery of claim 1, wherein the soluble organic catalyst is selected from the group consisting of riboflavin sodium phosphate, 1,4-dihydroxyanthraquinone, 1,8-dihydroxyanthraquinone, 2-hydroxy-1,4-naphthoquinone, bis(2-hydroxy-1,4-naphthoquinone), and any combination thereof.

4. The aqueous redox flow battery of claim 1, wherein the polysulfide based negolyte is $M_xS_y$, wherein M is a metal element that constitutes a soluble salt with sulfur element, x is 1 or 2, and y is 2 or 4.

5. The aqueous redox flow battery of claim 4, wherein M is Li, Na, K, Ni, Cu, Co or W.

6. The aqueous redox flow battery of claim 1, wherein a concentration of the soluble organic catalyst is 5 mM to 200 mM.

7. The aqueous redox flow battery of claim 1, wherein a concentration of the negolyte is 0.5 M to 2 M.

8. The aqueous redox flow battery of claim 1, wherein the solvent in the negolyte chamber is an alkaline aqueous solution.

9. The aqueous redox flow battery of claim 8, wherein the solvent in the negolyte chamber is an aqueous solution of LiOH, NaOH, KOH or any combination thereof.

10. The aqueous redox flow battery of claim 1, wherein the posolyte is selected from the group consisting of halogen, [Fe(CN)$_6$]$^{4-}$/[Fe(CN)$_6$]$^{3-}$, Fe$^{2+}$/Fe$^{3+}$, Mn$^{2+}$/MnO$_2$, Mn$^{2+}$/Mn$^{3+}$, MnO$_4^{2-}$/MnO$_4$, V$^{4+}$/VO$_2^+$, TEMPO/TEMPO$^+$, alkaline metal halide, and any combination thereof.

11. The aqueous redox flow battery of claim 1, wherein a concentration of the posolyte is 0.5 M to 2 M.

12. The aqueous redox flow battery of claim 1, wherein the solvent in the posolyte chamber is an aqueous solution of alkaline metal halide.

13. The aqueous redox flow battery of claim 1, wherein the separator is a charge-reinforced ion-selective membrane or an ion permeable membrane.

14. The aqueous redox flow battery of claim 1, wherein the positive electrode comprises a material selected from the group consisting of metal, carbon felt, carbon paper, graphene sheet, conducting polymer, and any combination thereof, and the negative electrode comprises a material selected from the group consisting of metal, carbon felt, carbon paper, graphene sheet, conducting polymer, and any combination thereof.

15. An aqueous redox flow battery, comprising:
a positive electrode;
a negative electrode;
a posolyte chamber containing a posolyte in a solvent;
a negolyte chamber containing a polysulfide based negolyte and a soluble organic catalyst in a solvent; and
a separator disposed between the posolyte chamber and the negolyte chamber, wherein:
the soluble organic catalyst has a potential lower than the polysulfide based negolyte; and
the soluble organic catalyst is selected from the group consisting of riboflavin sodium phosphate, 1,4-dihydroxyanthraquinone, 1,8-dihydroxyanthraquinone, 2-hydroxy-1,4-naphthoquinone, bis(2-hydroxy-1,4-naphthoquinone), and any combination thereof.

16. The aqueous redox flow battery of claim 15, wherein the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof.

17. The aqueous redox flow battery of claim 15, wherein the polysulfide based negolyte is $M_xS_y$, wherein M is a metal element that constitutes a soluble salt with sulfur element, x is 1 or 2, and y is 2 or 4.

18. An aqueous redox flow battery, comprising:
a positive electrode;
a negative electrode;
a posolyte chamber containing a posolyte in a solvent;
a negolyte chamber containing a polysulfide based negolyte and a soluble organic catalyst in a solvent; and
a separator disposed between the posolyte chamber and the negolyte chamber, wherein:
the soluble organic catalyst has a potential lower than the polysulfide based negolyte; and
a concentration of the soluble organic catalyst is 5 mM to 200 mM.

19. The aqueous redox flow battery of claim 18, wherein the soluble organic catalyst is selected from the group consisting of an alloxazine based compound, an anthraquinone based compound, a viologen based compound, a benzoquinone based compound, a naphthoquinone based compound, a quinoxaline based compound, a phenazine based compound, a phenothiazine based compound, a pteridine based compound, a fluorenone based compound, and any combination thereof.

* * * * *